United States Patent [19]

Browning, Jr. et al.

[11] Patent Number: 4,602,663
[45] Date of Patent: Jul. 29, 1986

[54] VENEER LATHE WITH POWERED NOSE BAR ROLL OF LARGE DIAMETER

[75] Inventors: Robert A. Browning, Jr., Portland, Oreg.; Leonard L. Hayes, Lewiston, Id.

[73] Assignee: The Coe Manufacturing Co., Painseville, Ohio

[21] Appl. No.: 638,309

[22] Filed: Aug. 7, 1984

[51] Int. Cl.[4] .................................................. B27L 5/02
[52] U.S. Cl. ...................................... 144/213; 144/211
[58] Field of Search ............................ 144/211, 212, 213; 464/73; 384/315; 308/79.1

[56] References Cited

U.S. PATENT DOCUMENTS

| 166,353 | 8/1875 | Fairchild | 144/213 |
|---|---|---|---|
| 198,404 | 12/1877 | McEachren | 144/213 |
| 211,436 | 1/1879 | Thompson | 144/213 |
| 528,120 | 10/1894 | Brown | 144/213 |
| 1,641,452 | 9/1927 | Osgood | 144/213 |
| 1,951,834 | 3/1934 | McCarroll | 144/209 |
| 2,562,472 | 7/1951 | Miller et al. | 144/213 |
| 2,659,401 | 11/1953 | Latimer | 144/213 |
| 2,695,044 | 11/1954 | Miller et al. | 144/215 |
| 2,984,526 | 5/1961 | Christensen | 308/79.1 |
| 3,040,791 | 6/1962 | Fauchon | 144/209 |
| 3,078,887 | 2/1963 | Heth | 144/209 |
| 3,207,194 | 9/1965 | Hedberg et al. | 144/213 |
| 3,221,786 | 12/1965 | Whipple | 144/209 |
| 3,372,721 | 3/1968 | James et al. | 144/209 |
| 3,393,538 | 7/1968 | Mercier | 69/10 |
| 3,421,560 | 1/1969 | Springate | 144/209 |
| 3,455,354 | 7/1969 | Calvert | 144/209 |
| 3,473,585 | 10/1969 | Cremona | 44/313 |
| 3,480,053 | 11/1969 | Whipple | 144/213 |
| 3,570,732 | 3/1971 | Merck | 225/94 |
| 3,584,666 | 6/1971 | Jensen | 144/213 |
| 3,670,790 | 6/1972 | Porter et al. | 144/213 |
| 3,680,613 | 8/1972 | Daniels | 144/209 R |
| 3,741,105 | 6/1973 | Beasley | 99/589 |
| 3,780,605 | 12/1973 | Fingerle et al. | 83/4 |
| 3,844,207 | 10/1974 | Townsend | 99/589 |
| 3,866,642 | 2/1975 | Walser | 144/212 |
| 3,884,049 | 5/1975 | Pauli | 464/73 |
| 4,061,169 | 12/1977 | Hasegawa | 144/213 |
| 4,073,326 | 2/1978 | Pank et al. | 144/209 |
| 4,123,959 | 11/1978 | Schill | 83/874 |
| 4,221,247 | 9/1980 | Katsuji | 144/211 |
| 4,234,024 | 11/1980 | Koike | 144/213 |
| 4,262,716 | 4/1981 | Hasegawa | 144/213 |
| 4,263,948 | 4/1981 | Hasegawa | 144/213 |
| 4,269,243 | 5/1981 | Hasegawa | 144/213 |
| 4,289,179 | 9/1981 | Koba | 144/211 |
| 4,313,481 | 2/1982 | Cremona | 144/209 |
| 4,335,764 | 6/1982 | Schmidt | 144/209 R |
| 4,380,259 | 4/1983 | Brookhyser et al. | 144/357 |
| 4,393,761 | 7/1983 | Murphy | 99/589 |
| 4,396,049 | 8/1983 | Calvert et al. | 144/209 |
| 4,408,519 | 10/1983 | Schill | 99/486 |

FOREIGN PATENT DOCUMENTS

2027379  2/1980  United Kingdom ............... 144/213

Primary Examiner—Francis S. Husar
Assistant Examiner—Jorji M. Griffin
Attorney, Agent, or Firm—Klarquist, Sparkman, Campbell, Leigh, & Whinston

[57] ABSTRACT

A veneer lathe apparatus is described with a powered nose bar roll of large diameter that is capable of peeling logs down to an extremely small core diameter on the order of about $2\frac{1}{2}$ inches for soft wood. The large diameter nose bar roll prevents jam-up of wood chips and trash at the junction between such roll and the log and greatly increases cutting time between lathe knife sharpenings. Both ends of the nose bar roll are connected through flexible couplings of plastic to the output shafts of two separate drive motors. The nose bar roll may be provided with a grooved outer surface for greater friction and can apply up to 40 percent of the total torque required for rotation of the log and to pressure the log for compression of its surface in front of the lathe knife during peeling. The nose bar roll is of larger diameter than the minimum log core and preferably such diameter is at least fifteen times the thickness of the wood veneer being peeled. For example, a nose bar roll diameter of $3\frac{3}{4}$ inches has been found suitable for peeling veneers in the thickness range of 0.1 and 0.2 inches. A plurality of open bearings are spaced along the length of the nose bar roll for supporting such nose bar and lubrication means is provided for such bearings by means of a plurality of oil passages which transmit oil through the bearing sleeves by air pressure to the inner surface of the bearing sleeve.

21 Claims, 10 Drawing Figures

VENEER LATHE WITH POWERED NOSE BAR ROLL OF LARGE DIAMETER

BACKGROUND OF INVENTION

The subject matter of the present invention relates generally to veneer lathe apparatus for peeling wood veneer from rotating logs, and in particular to such lathe apparatus having a powered nose bar roll of large diameter positioned in front of the lathe knife blade for compressing the surface of the log during peeling, and for supplying a portion of the torque to rotate such log. The veneer lathe apparatus of the present invention has been found to be especially useful for peeling logs down to an extremely small core diameter of, for example, 2½ inches for soft wood such as fir, thereby reducing waste and increasing veneer yield. The large diameter nose bar roll also prevents jam-ups of wood chips at the junction between the nose bar roll and the log, and greatly increases cutting time between lathe knife sharpening for more efficient operation of the lathe apparatus.

Previously it has been proposed in U.S. Pat. No. 3,207,194 of Hedberg et al issud Sept. 21, 1965; U.S. Pat. No. 3,680,613 of Daniels et al issued Aug. 1, 1972 and U.S. Pat. No. 4,335,764 of Schmidt issued June 22, 1982 to provide a veneer lathe apparatus with a powered nose bar roll in engagement with the side of the log adjacent the veneer knife blade for rotating the log and applying pressure to the log during peeling. However, in all of these patents the nose bar roll is of relative small diameter which is much smaller than the minimum log core diameter to which the log can be peeled. Thus, a conventional powered nose bar roll is typically on the order of about ⅝ inch in diameter, so that only a relatively small amount of torque can be applied to the log by the powered nose bar roll. In addition, wood chips and other trash tend to lodge at the junction between the nose bar roll and the log which necessitates periodically disengaging such roll and stopping peeling for cleaning purposes to clear the jam-up, thereby resulting in reduced production and variations in the veneer thickness. In the Hedberg and Daniels patents the nose roll has a smooth surface and is driven from one end by a motor connected through a drive chain to a drive shaft which is rigidly coupled to the nose bar roll by a bearing assembly that limits the amount of power which can be transmitted to the nose bar roll. The torque applied to the log by nose bar roll is greatly increased in the present invention by providing a grooved roll surface on such roll, connecting two separate motor drives to the opposite ends of the nose bar roll and coupling the drive shafts of such motors through flexible plastic couplings to the nose bar roll for more efficient power transfer. In the Daniels et al patent the nose bar roll is adjusted vertically and horizontally with respect to the knife blade by means of a fluid cylinder and motor driven worm shaft to provide a variable veneer thickness control but results in a lathe apparatus of much greater cost and complexity.

The Schmidt patent shows a similar teaching and also provides powered backup rolls for engaging the side of the log at a position remote from the knife blade and powered nose bar roll so that such backup rolls can apply additional torque to the log and prevent deflection of small diameter log cores. The backup rolls are mounted on pivoted support members which are geared together to change the spacing of such backup rolls as the log diameter decreases. In Schmidt, the powered nose bar roller is held in a fixed position on spaced support bearings which are lubricated by water. However, there is nothing to indicate that an oil lubrication means should be provided for bearing sleeves in the bearings and the oil passages connected to a supply of pressurized air for blowing the oil out of such oil passages onto the surface of the nose bar roll for more uniform lubrication and to clean such oil passages in the manner of the present invention.

A veneer lathe apparatus having a powered nose bar roll which is driven by a separate drive roll in contact with such nose bar roll is shown in U.S. Pat. No. 3,421,560 of Springate issued Jan. 14, 1969 and U.S. Pat. No. 3,584,666 of Jensen issued June 15, 1971. However, the nose bar roll of these patents is of extremely small diameter less than the minimum log core diameter, and therefore, can apply very little torque to the log for rotation thereof. Both of these patents use backup rolls separate from the nose bar roll for preventing deflection of the small diameter log core after peeling the log to such a small diameter. The Springate patent uses a cam means for adjusting the backup rolls during peeling to enable the log to be peeled to a minimum core diameter of about 4.0 inches. The Jensen patent detects when wood chips, trash or other obstructions become jammed at the junction between the small diameter nose bar roll and the log and disengages the roll from the log to free the jam. This jam-up problem is avoided by the large diameter nose bar roll of the present invention which causes the wood chips and other obstructions to pass beneath such roll.

As shown in U.S. Pat. No. 4,263,948 of Hasegawa issued Apr. 29, 1981 and U.S. Pat. No. 4,269,243 of Hasegawa issued May 26, 1981, a veneer lathe apparatus has been provided with a powered drive roll adjacent the knife including a plurality of large diameter discs spaced apart and extending through slots in a pressure bar so that sharp teeth on such discs engage the log for applying additional torque to rotate the log. However, these spaced discs have the disadvantage that their teeth mark the veneer and they do not compress the log in the space between discs as is required for uniform high quality veneer. Such lathe apparatus are also subject to jamming of wood chips because of the fixed nose bar segments positioned between the discs. These lathe apparatus are complicated and expensive including cam means for adjusting the drive roll relative to the knife. These problems are avoided in the veneer lathe apparatus of the present invention by causing a powered nose bar roll of large diameter to engage the log along substantially its entire length, connecting both ends of the roll to drive motors and by increasing the friction of such nose bar roll by providing grooves in its outer surface extending longitudinally of the bar axis of the roll axis.

SUMMARY OF INVENTION

It is therefore one object of the present invention to provide an improved veneer lathe apparatus having a nose bar roll of large diameter which is capable of peeling logs down to a smaller core diameter than such roll diameter for more efficient veneer production.

Another object of the invention is to provide an improved veneer lathe apparatus with a powered nose bar roll of large diameter greater than fifteen times the thickness of the veneer for thicknesses of 0.1 inch and greater to prevent trash from jamming the roll and to increase the cutting time between lathe knife sharpening.

A further object of the invention is to provide such a veneer lathe apparatus in which the nose bar roll is provided with a grooved surface to increase friction and thereby provide a greater driving torque for rotation of the log.

An additional object of the invention is to provide such a veneer lathe apparatus in which the nose bar roll is driven by two separate motors connected to the opposite ends of such roll by flexible couplings to provide greater driving power to the roll.

Still another object of the invention is to provide such an improved lathe apparatus in which the nose bar roll is mounted in bearings spaced longitudinally along such roll, including bearing sleeves which are lubricated by oil blown by pressurized air out of the oil passages in the sleeves onto the nose bar roll, such roll having a grooved surface to spread the oil the full width of the bearing sleeve for more efficient lubrication and to prevent clogging of the passages.

A still further object of the invention is to provide such an improved veneer lathe apparatus of greater versatility which has spur knife means for cutting the sides of the veneer including knife groove sleeve means provided on the ends of the nose bar for receipt of the spur knife in the groove of such sleeve to enable the spur knife position to be changed for different veneer widths merely by replacing the knife groove sleeve.

DESCRIPTION OF DRAWINGS

Other objects and advantages of the present invention will be apparent from the following detailed description of a preferred embodiment thereof and from the attached drawings of which.

DESCRIPTION OF PREFERRED EMBODIMENT

Figures 1, 9:
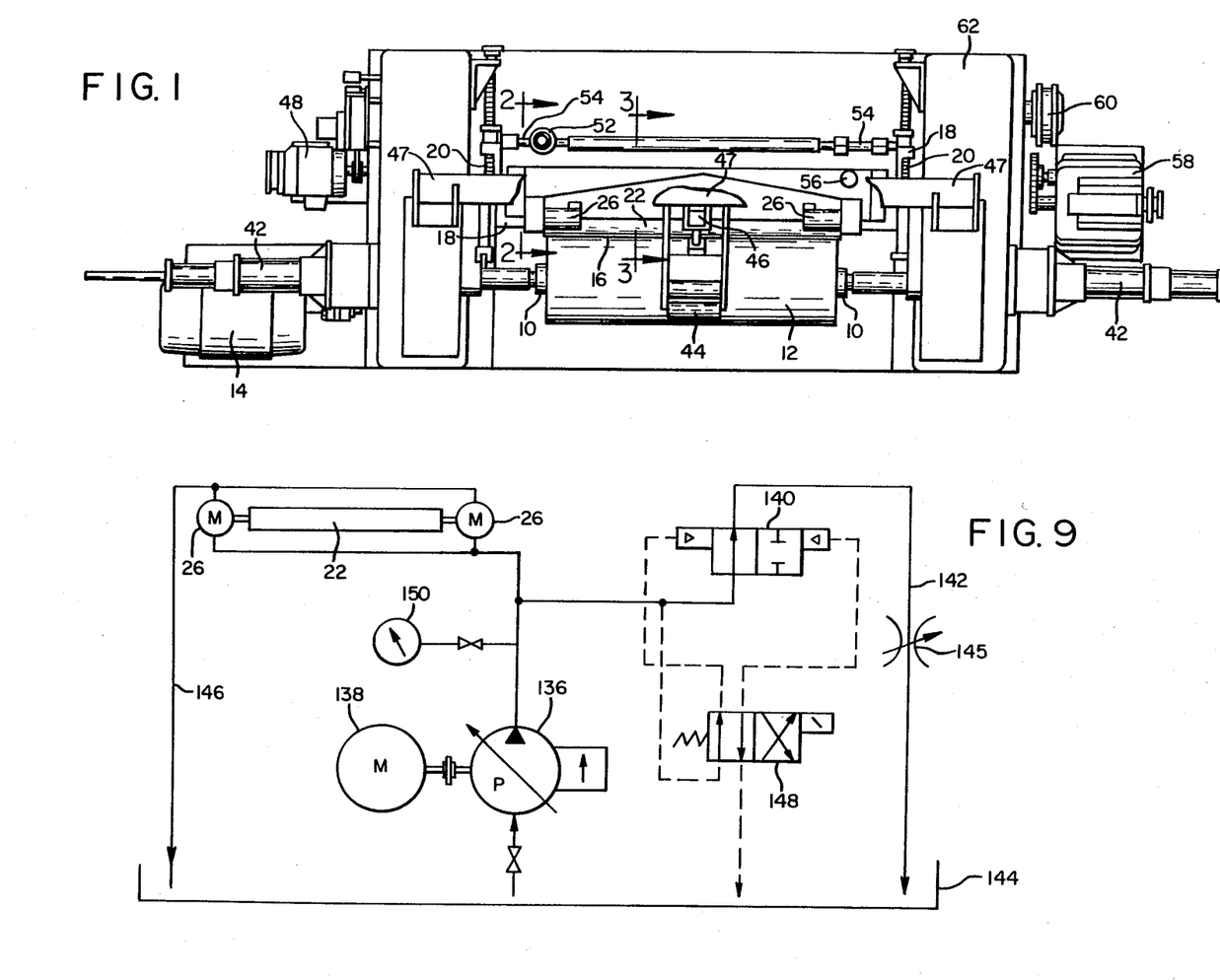
FIG. 1 is a top plan view of a veneer lathe apparatus in accordance with one embodiment of the present invention.
FIG. 9 is a schematic diagram of a fluid control circuit for operating the drive motors connected to the opposite ends of the nose bar roll.
Figure 2:
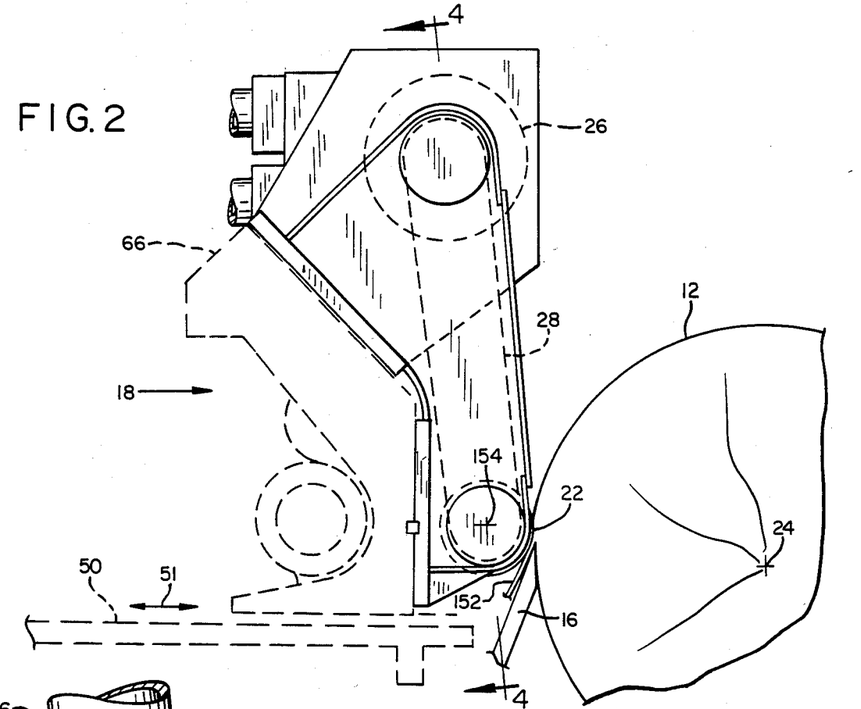
FIG. 2 is an enlarged vertical section view along the line 2—2 of FIG. 1 showing the motor drive for the powered nose bar roll.
Figure 3:
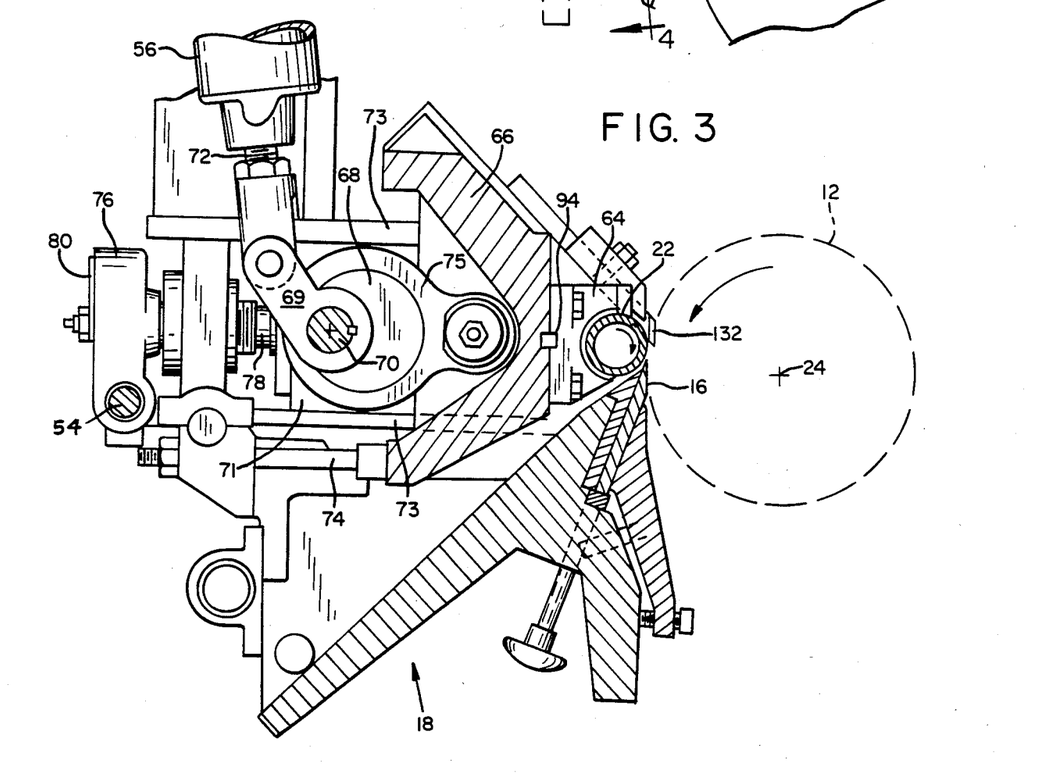
FIG. 3 is an enlarged vertical section view along the line 3—3 of FIG. 1 showing the support mechanism for the nose bar roll and the lathe knife.

As shown in FIG. 1, a veneer lathe apparatus in accordance with the invention includes a pair of drive spindles 10 which engage the opposite ends of a log 12 for rotation of such log by a main drive motor 14 connected to such spindles. Veneer is peeled from the rotating log by a lathe knife 16 engaging the surface of the log 12 and extending the entire length of the log. The knife is mounted on a knife carriage 18 which is moved substantially horizontally on a pair of feed screws 20 toward the center of the log during peeling. As shown in FIGS. 2 and 3, a nose bar roll 22 is pressed into engagement with the surface of the side of the log 12 along the entire length of the log at a position in front of the lathe knife 16 in order to compress the surface of the log before it is peeled by such knife as the log is rotated about an axis of rotation 24 of the spindles 10.

Figure 4:
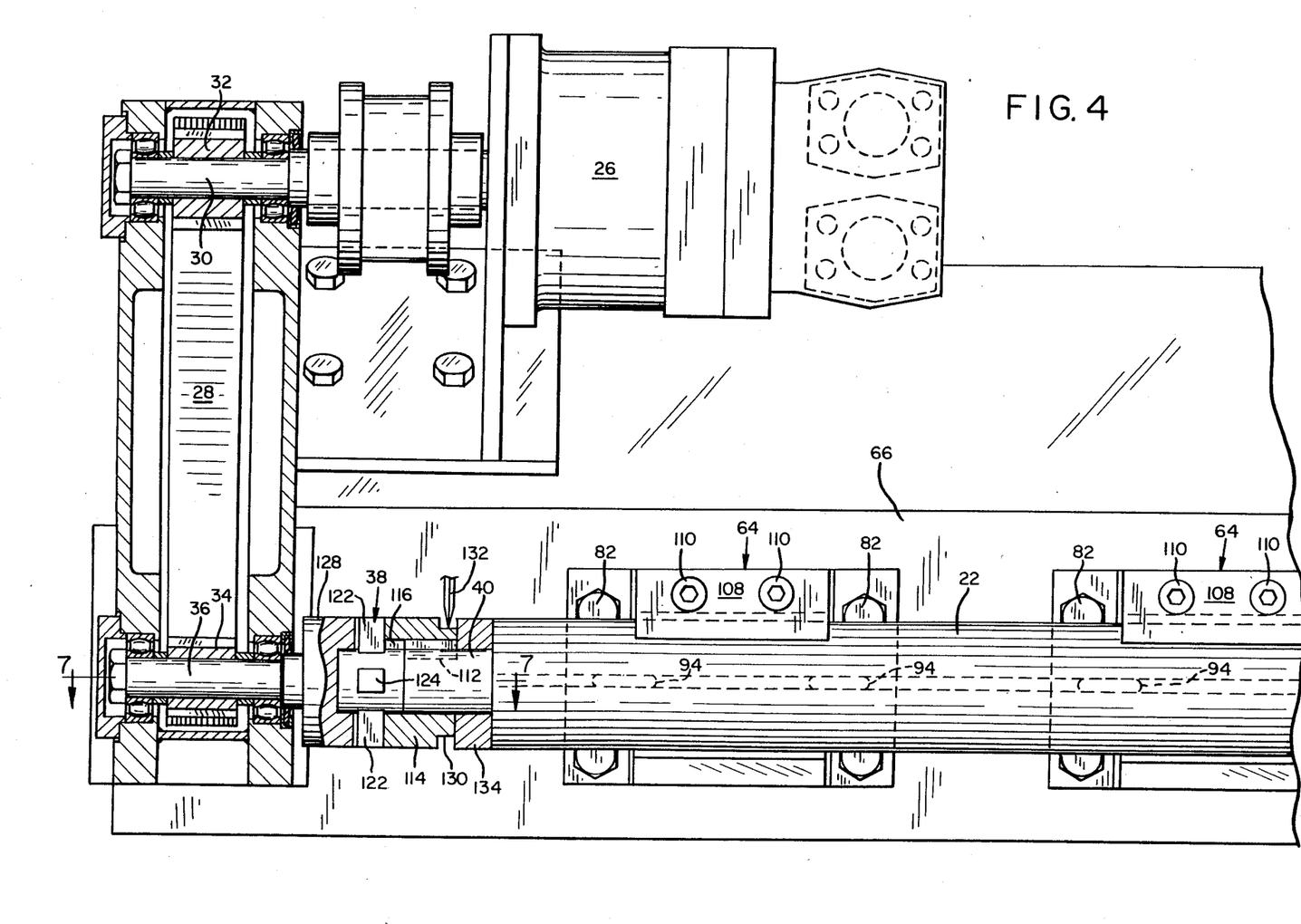
FIG. 4 is an enlarged section view along the line 4—4 of FIG. 2 showing the drive means and support bearings for the powered nose bar roll.

The nose bar roll 22 is powered for rotation by two hydraulic motors 26 connected to the opposite ends of the nose bar roll by drive chains 28 as shown in FIG. 4. Thus, an output shaft 30 of each motor 26 is attached to a first sprocket 32 and the drive chain 28 couples such first sprocket to a second sprocket 34 attached to an output drive shaft 36. The output drive shaft is connected by a flexible coupling 38 of plastic material to the end 40 of the nose bar roll 22.

As shown in FIG. 1, the chucks on the ends of the spindles 10 are extended into engagment with and retracted from the opposite ends of the log by a pair of hydraulic cylinders 42 during loading of the log and unloading of the log core. A backup roll 44 may be provided which engages the center of the side of a log at a position radially spaced from the lathe knife 16 and the powered nose bar roll 22 in order to prevent deflection of the log core after the log has been peeled to a small diameter. For example, the backup roll 44 engages the log when it is peeled to a diameter of about 12 inches down to its minimum core diameter which is about 2½ inches for fir and other soft wood using the present invention. The backup roll is raised and lowered by a control cylinder 46 attached to a support beam 47 supporting such roll. The backup roll 44 may be an idler roll or it may be powered separately by a hydraulic motor (not shown) to provide additional torque for rotation of the log 12 during peeling.

The knife carriage 18 which supports the lathe knife 16 and the powered nose bar roll 22 is moved by a carriage motor 48 during loading and unloading to cause the carriage to slide substantially horizontally along a knife carriage way (not shown) and to cause a pressure bar support 66 to slide along pitchway tracks 50 toward and away from the log 12, as shown by arrows 51 in FIG. 2. The pressure of the nose bar roll 22 against the log is adjusted by a pressure motor 52. The pressure motor 52 rotates a pressure adjustment shaft 54 shown in FIG. 1 which moves the pressure bar assembly toward and away from the log to adjust the pressure exerted on such log in the manner hereafter described relative to FIG. 3. In addition, a quick release cylinder 56 is shown in FIGS. 1 and 3 which quickly moves the pressure bar roll 22 out of engagement with the log during roundup of the log prior to peeling to allow trash to rapidly go through before peeling starts. After roundup of the log is complete, the quick release cylinder then advances the pressure bar rapidly into engagement with the log and peeling proceeds by slow advancement of the entire knife carriage along lead screws 20. It should be noted that during peeling, the knife carriage 18 is moved on lead screws 20 by the main drive motor 14 which is coupled thereto through gear box 58, clutch 60 and automatically lubricated feed and gear box drive 62 in a conventional manner.

As shown in FIG. 3, the nose bar roll 22 is mounted by a plurality of longitudinally spaced bearings 64 on a pressure bar 66. The pressure bar is urged outwardly into the position shown, or is retracted by rotation of an eccentric 68 with the quick release cylinder 56. The eccentric 68 is connected to a shaft 70 for rotation about the axis of such shaft which is coupled by a lever arm 69 to the end of a piston rod 72 of the quick release cylinder 56. The shaft 70 is attached to a rectangular block 71 which is mounted for horizontal sliding movement between a pair of guide plates 73 when the pressure adjustment shaft 54 is rotated by motor 32 of FIG. 1. The eccentric 68 is connected by a coupling link 75 to the pressure bar 66. As a result, actuation of the quick release cylinder 56 to extend the piston rod 72 causes the eccentric 68 to rotate 90 degrees in a counterclockwise direction about shaft 70, thereby moving the link 75, the pressure bar 66 and the pressure bar roll 22 horizontally to the left in FIG. 2 to disengage the nose bar roll from the log 12. This allows trash to clear rapidly past the pressure bar during roundup of the log by the lathe knife 16. After roundup is completed, the quick release cylinder 56 again retracts the piston rod 72 into the position shown which causes the eccentric 68 to rotate 90 degrees in a clockwise direction back into the position shown, thereby moving the pressure bar 66 and the pressure bar roll 22 horizontally to the right into the position shown in FIG. 3 with the pressure bar in engagement with the log and peeling begins.

The movement of the pressure bar 66 relative to the knife 16 is guided by guide rods 74 during actuation of the quick release cylinder 56 as described above and during the pressure adjustment of such bar by motor 52 through pressure adjustmment shaft 54. The pressure adjustment shaft 54 is connected by by worm gear within a gear housing 76 to a feed screw 78 which moves block 71 and the entire pressure bar assembly 22, 64, 66, 68, 70, and 75 relative to the log by a precise amount in order to adjust the pressure applied to such log by the nose bar roll 22. A pressure indicator pointer 80 is attached to the pressure adjustment screw 78 on the outside of the worm gear housing 76 to indicate the pressure adjustment of the nose bar roll 22. A pressure sufficient to cause a compression of about 10 percent of the thickness of the veneer before it is cut is applied to the surface of a large diameter log by the nose bar roll as hereafter disccussed relative to FIG. 10.

Figure 5:
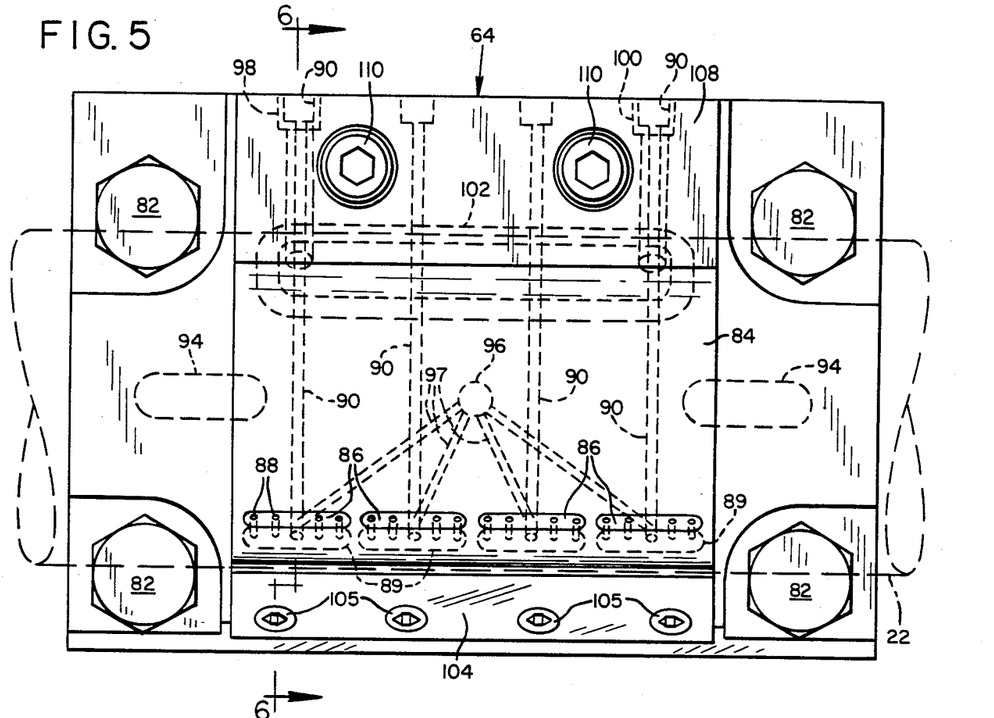
FIG. 5 is an enlarged plan view of one of the bearings used for supporting the nose bar roll with the roll removed for clarity.
Figure 6:
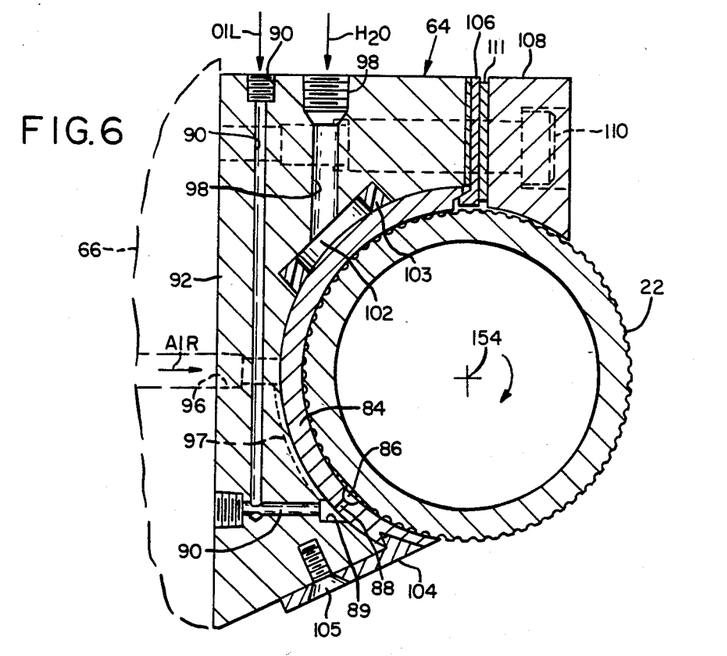
FIG. 6 is a vertical section view taken along the line 6—6 of FIG. 5.

As shown in FIGS. 4, 5 and 6, the pressure bar roll 22 is mounted on a plurality of longitudinally spaced bearings 64 attached to the pressure bar 66 by mounting bolts 82. Each of the bearings 64 includes an open bearing sleeve 84 which is mounted in contact with the outer surface of the pressure bar roll 22 so that such sleeve extends around the axis of such roll less than 180 degrees.

As shown in FIGS. 5 and 6, each of the bearing sleeves 84 is provided with four lubrication slots 86 about ¼ inch wide by 1 and 7/32 inch long by 1/16 inch deep in its front surface which each communicate through four outlet openings 88 of 0.052 inch diameter extending through the bearing sleeve to one of four lubrication chambers 89 connected to an oil supply through lubrication passages 90 and pulsed oil injectors (not shown). The four lubrication passages 90 are each formed by two perpendicular intersecting bores of ⅛ inch diameter in a bearing support block 92. The rear end of the horizontal bore is closed by a plug so that oil flows down from the top end of the vertical bore through passage 90 to chamber 89 and out through openings 88 to slot 86. The lubrication chambers 89 are formed by recesses in the front surface of the support block which is fastened by bolts 82 to the pressure bar 66 at a position determined by two keys 94 and associated keyways in such pressure bar and support block. A supply of pressurized air having a continuous low level pressure of about 20 psi. is connected by a passage 96 of 5/16 inch diameter through the pressure bar and the support block to four connecting grooves 97 of ⅛ inch wide and 1/16 inch deep in the surface of the support block 92 which are connected to the four lubrication chambers in passages 90 for blowing the oil out of the lubrication passages through the outlet openings 88 and slots 86 in the bearing sleeve 84 onto the grooved outer surface of the nose bar roll 22. It should be noted that the lubrication slots 86 are positioned adjacent the bottom of the bearing sleeve 84 and the pressure bar roll 22 rotates in a clockwise direction in FIG. 6 so that oil is carried by the grooves in such roll up and distributed over the entire surface of the bearing as the oiled surface of the roll rotates past such bearing surface. In this manner, the bearing sleeve 84 is uniformly lubricated across its entire width due to the grooved surface of the roll. Also air pulses of about 90 psi. pressure may be applied to passage 96 after the peel cycle is complete to clean the bearing and the roll surface.

In order to cool the bearing sleeve, a water inlet passage 98 and a water outlet passage 100 are provided by vertical bores in the bearing support head 92. The water passages 98 and 100 communicate with a water chamber 102 provided in the outer surface of the support head and sealed by a sealing gasket 103 of rubber to the rear surface of the bearing sleeve 84. The water chamber 102 applies cooling water to the bearing sleeve in order to conduct away the heat generated therein due to frictional engagement with the nose bar roll 22. Preferably, the bearing sleeve 84 is made of bronze and is held in place by a first retainer plate 104 fastened by screws 105 to the bottom of the bearing support head 92 and by a second retainer plate 106 which is clamped between such bearing support head and a bearing cap member 108 which is bolted to the support block by two bolts 110. It should be noted that the bearing cap 108 is separated by a spacer shim 111 from the retainer plate 106 so that it is spaced from and does not touch the surface of the bearing cap. Thus, the bearing sleeve 84 only contacts the outer surface of the roll 22 over an angle less than 180 degrees of, for example, about 165 degrees and such roll is supported at its opposite ends 40 by the flexible couplings 38 and drive shafts 36 in a manner hereafter described and shown in FIGS. 7 and 8.

The nose bar roll 22 is made of larger diameter than the diameter of the minimum log core which can be peeled by the lathe apparatus for thicknesses of 0.1 inch and greater. It has been found that nose bar roll 22 should have a diameter of at least 15 times the thickness of the wood veneer peeled by the lathe apparatus. Thus, for veneer having a thickness between 0.1 and 0.2 inch, a nose bar roll 22 having an outer diameter of 3.75 inches is satisfactory. In order to increase the friction between the outer surface of the nose bar roll and the log, a fluted outer surface is provided on such nose bar roll by a plurality of longitudinal grooves extending substantially the full length of the roll. Thus, for a nose bar roll having an outer diameter of 3.75 inches, grooves having a depth of 0.015 inch and a spacing of about 0.125 inch between grooves is provided which results in about 60 parallel longitudinal grooves in the outer surface of the row. Each of the grooves is separated by a flat projection 0.125 inch wide formed by a portion of the outer surface of the nose bar roll 22 which engages the surface of the log.

Figure 8:
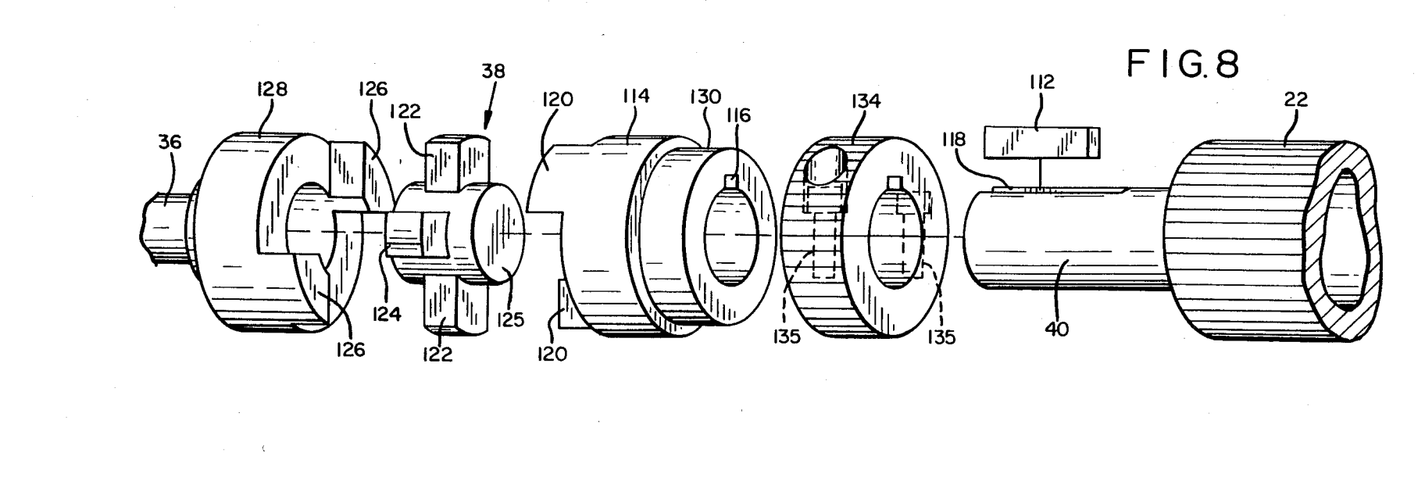
FIG. 8 is an exploded view of the coupling of FIG. 7.

The opposite ends 40 of the roll 22 are each connected by a key 112 to a notched connector sleeve 114 having a keyway 116 therein for receipt of such key. A similar keyway 118 is provided in the end 40 of the roll. The connector member 114 has a pair of projections 120 spaced 180 degrees apart and formed by grooves on the outer end of such connector. These projections engage one of two pairs of projections 122 and 124 extending radially outward from the flexible coupling member 38 which is made of synthetic plastic material, such as ultra high molecular weight polyethylene. Thus, the flexible coupling member 38 has a body 125 of a generally cylindrical shape having two pairs of rectangular projections 122 and 124 extending radially outward and spaced 90 degrees apart. One pair 122 of projections on flexible coupling member 38 extends in the notches between the pair of projections 120 on the connector member 114 attached to the end 40 of the nose bar roll 22. The second pair of projections 124 on the flexible coupling member 38 extend into grooves between a pair of projections 126 on a second connector member 128 fixed to the end of the drive shaft 36 as shown in FIG. 8. The cylindrical body 125 of the flexible coupling 38 enables the coupling to rotate with its axis slightly out of alignment with the axis of drive shaft 30 to allow the roll 22 to engage the bearing sleeves 84 during peeling and return into alignment after peeling.

Figure 7:
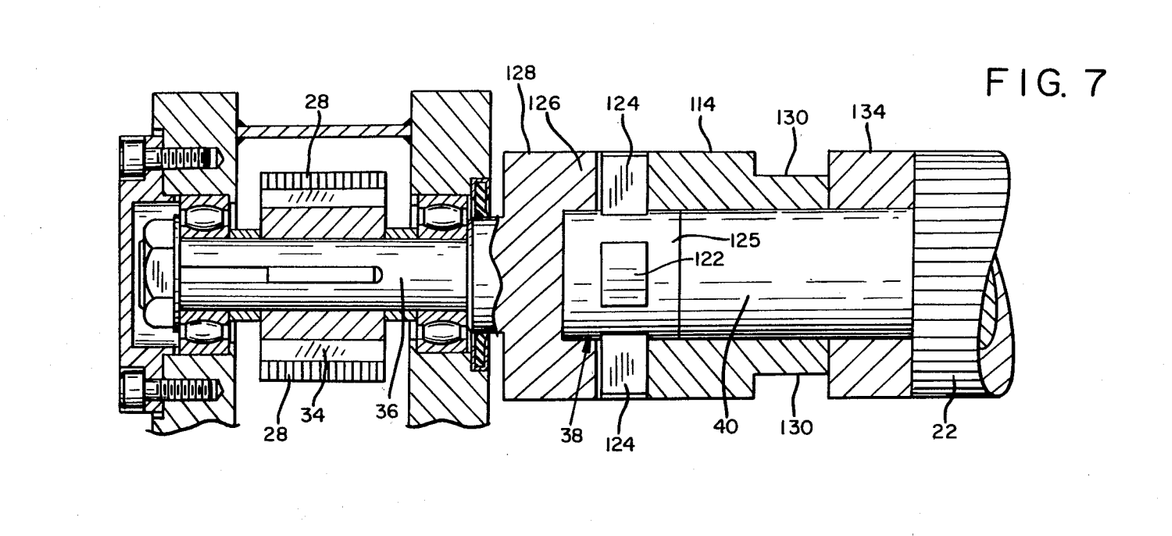
FIG. 7 is an enlarged view of a portion of FIG. 4 showing the drive shaft and flexible coupling to the end of the nose bar roll.

As shown in FIGS. 4 and 7, each connector sleeve 114 has a U-shaped annular knife groove 130 in its outer surface. Two spur knives 132 are mounted at the opposite ends of the nose bar roll 22 so that their blades extend into the grooves 130 in order to trim the side edges of the veneer to determine the width of the veneer. A split spacer sleeve member 134 is provided on one roll end 40 and clamped by bolts 135 joining the sleeve members to the roll end 40 at a position between the connector member 114 and the end of roll 22 to form one side of the groove 130. Thus, in order to change the location of the spur knife groove 130 relative to the end of the roll 22 for different widths of veneer, the spacer sleve 134 is unbolted to allow connector sleeve 114 to slide on end 40 for removal of roll 22. Then sleeves 114 and 134 are merely replaced with sleeves of different length in order to move the knife groove 130 to the right or left from the position shown in FIGS. 4 and 7. It should be noted that the sleeve 134 may also be provided with a grooved or fluted outer surface which matches the fluted surface of the roll 22. However, this is not absolutely necessary.

The flexible coupling elements 38 couple the opposite ends of the nose bar roll 22 to the output shafts 36 of a pair of hydraulic motors 26 which are operated by a pressure compensated variable delivery pump 136 as shown in FIG. 9. The pump 136 has a volume adjustment indicated by the arrow in the pump symbol circle for controlling the maximum speed of the nose bar roll 22 by changing the volume flow through the hydraulic motors 26. The pump 136 is driven by an electric pump motor 138 and is connected to a two-position bypass valve 140 which, in the open position shown, bypasses most of the liquid flowing from the output of the pump through a bypass line 142 to a fluid sump 144 containing oil or other liquid to prevent rotation of the roll 22. However, a small amount of liquid determined by the setting of a flow control valve 145 is allowed to flow through motors 26 in the open position of bypass valve 140 to bias the motors for faster response without rotating the roll 22. When bypass valve 140 is moved to the left and closed, fluid then flows from the output of pump 136 through the two hydraulic motors 26 to drive the nose bar roll 22 from the opposite ends thereof. The outputs of the hydraulic motors 26 are connected through an output line 146 to the sump which may contain approximately 200 gallons of oil. The bypass valve 140 is operated by a control valve 148 which may be solenoid actuated and spring biased in the position shown to normally hold the bypass valve 140 in an open position. Thus, when the solenoid valve 148 is actuated, it slides to the left into a position which causes the bypass valve 140 to be moved to the left into a closed position, thereby enabling the hydraulic motors 26 to be actuated by the pump. A pressure gauge 150 is connected to the output line of the pump to monitor the output pressure of the pump which is set up at approximately 2,300 psi. If the output pressure of the pump exceeds 2,600 psi., a relief valve (not shown) which may be connected to the output of pump 136 is actuated by such pressure to bypass the pump output to the sump and disable the motors 26. It should be noted that the single pressure compensated variable delivery pump 136 shown can be replaced by two separate pumps of this type each connected to a different one of the two hydraulic motors 26, in which case the capacity of each pump is reduced to one half that of pump 136, or to 34 gallons per minute when driving a hydraulic motor 26 of about 60 hp.

Figure 10:
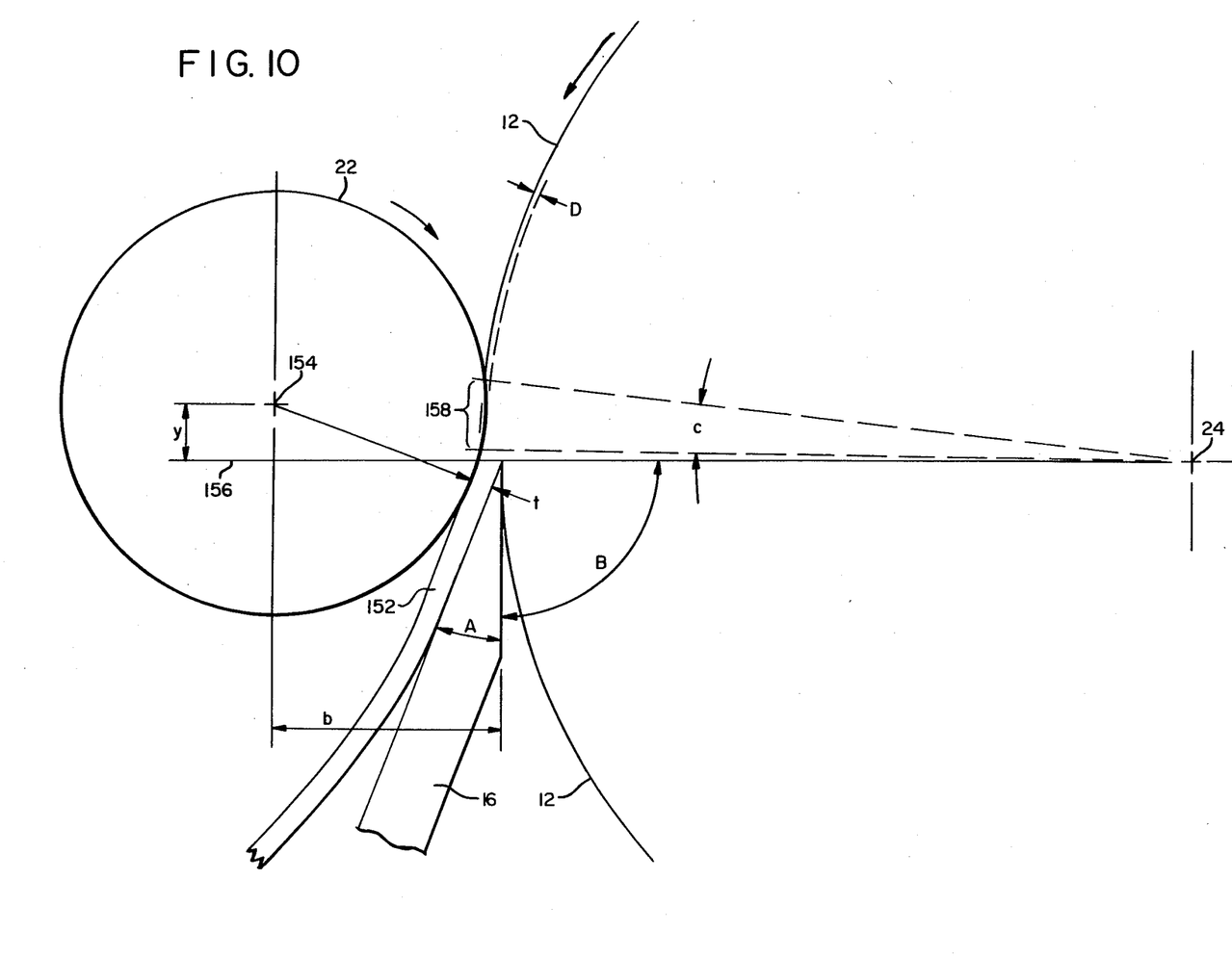
FIG. 10 is an enlarged view of a portion of FIG. 2 showing the operation of the nose bar roll of large diameter in compressing the log during peeling by the lathe knife.

As shown in FIG. 10, when the nose bar roll 22 is urged against the surface of the log 12, it compresses the log so its surface is depressed by an amount D equal to 10 percent of the thickness T of the veneer strip 152 peeled from such surface by the knife 16 when the log has a diameter of approximately 48 inches. However, this radial compression D decreases to about seven percent of the thickness T when the log diameter is reduced to approximately 4 inches. The nose bar roll 22 is positioned so that the center 154 of such roll is spaced a distance Y above a horizontal plane 156 passing through the point of the lathe knife 16 and axis of rotation 24 of the log 12 about the spindles 10. When the diameter of the nose bar roll 22 is 3.75 inch, the distance Y equals 7/16 of an inch for a veneer thickness range of approximately 0.10 to 0.20 inch. Under these conditions, a wide compression zone 158 is produced where the nose bar roll 22 contacts the surface of the log extending down from the upper edge of such contact region down to a point slightly above the tip of the knife 16 through a compression angle C. As a result of this wide zone of compression 158, hard particles such as pebbles, sand or other types of grit, embedded in the log apparently migrate past the top of the knife blade 16 during peeling without striking such tip to cause dulling. This greatly increases the useful lifetime of the lathe knife and at least doubles the time between sharpenings up to at least eight hours when peeling fir logs so that such sharpening or blade changing can be achieved between employee shifts. Previously, the useful lifetime of the lathe knife was about 2 to 4 hours for fir logs requiring the veneer peeling operation to stop during an employee shift for sharpening or blade changing.

The blade angle A between the opposite sides of the knife blade is typically 21 degrees. The knife set-up angle B between the front edge of the knife and the horizontal plane 156 is typically 91 degrees for a large diameter log, above about 24 inches diameter, down to 89 degrees for a small diameter log below about 24 inches diameter. It has been found that by using a nose bar roll 22 of large diameter, at least fifteen times the thickness of the veneer 152, the lathe apparatus of the present invention can peel a log down to a much smaller minimum core diameter on the order of 2½ inches for soft wood, such as fir. Thus, the nose bar roll diameter is greater than the minimum core diameter which can be peeled using such roll. In addition, wood chips and other trash which tend to jam in the crack at the junction between the nose bar roll 22 and the surface of the log above the compression zone 158 are caused to be carried by the larger diameter nose bar roll through the space between such roll and the knife 16. This eliminates the need to disengage the nose bar roll 2 from the log and stop peeling when a jam-up occurs as previously was necessary using conventional small diameter nose bar rolls on the order of ⅜ inch diameter. A considerable savings of veneer and a more efficient operation is the result.

The nose bar roll 22 is only disengaged from the surface of the log 12 during roundup prior to peeling and this is accomplished by the quick release cylinder 56 as described above in connection with FIG. 3. Once peeling starts it can be continued down to the minimum core diameter in most cases in spite of wood chips or other trash accumulating in the space between the roll and the log above the knife. Thus, because of the large diameter of the nose bar roll and the fact that it is a driven or powered roll, such roll carries the wood chips and other trash through the space between the roll and the knife 16 to prevent jam-ups and avoiding the need to disengage the roll from the log. Such a nose bar roll, when provided with a grooved outer surface and driven at both ends by hydraulic motors 26, can supply up to 40 perecent of the total required torque for turning the log 12. The other 60 percent of the torque is supplied by the spindles engaging the opposite ends of the log and by the backup roll 44 when such backup roll is powered.

It will be obvious to those having ordinary skill in the art that many changes may be made in the preferred embodiment of the invention. Therefore, the scope of the present invention should be determined by the following claims.

We claim:
1. Veneer lathe apparatus, comprising:
    rotatable support means for supporting a log for rotation about an axis of rotation;
    cutter means for peeling wood veneer from said log and including a knife blade supported for engaging the side of the log and extending substantially the entire length of said log;
    drive means for engaging said log to cause said log to rotate about said axis of rotation;
    carriage means for moving said cutter means toward said log during said peeling to maintain said knife blade in engagement with said log; and
    a nose bar roll engaging the side of said log on at least the major portion of the length of said log and extending along but ahead of said knife blade to compress the surface of said log before it is cut by said knife blade to form a sheet of veneer, said nose bar roll having a diameter at least 15 times the thickness of said veneer and greater than the minimum log core diameter to which said log can be peeled by said apparatus, and providing the primary means for compression of the log during peeling.

2. Lathe apparatus in accordance with claim 1 in which the nose bar roll is driven by motor means.

3. Lathe apparatus in accordance with claim 2 in which the nose bar roll is connected by a flexible coupling means to drive shaft means for rotating said nose bar roll in response to rotation of said drive shaft means by said motor means.

4. Lathe apparatus in accordance with claim 3 in which both ends of the nose bar roll are driven by separate drive shaft means and separate motor means.

5. Lathe apparatus in accordance with claim 3 in which the flexible coupling means includes a flexible coupling member of synthetic plastic material connecting one end of the nose bar roll to an output drive shaft of the drive shaft means.

6. Lathe apparatus in accordance with claim 5 in which the flexible coupling member is provided with projections which engage notches on one end of the nose bar roll and on one end of said output shaft.

7. Lathe apparatus in accordance with claim 6 in which said one end of said nose bar roll and one end of said output drive shaft are both provided with a pair of notches which are engaged by two pairs of projections on the coupling member.

8. Lathe apparatus in accordance with claim 1 in which the nose bar roll has a diameter greater than 1.5 inches and a grooved outer surface for engagement with the log.

9. Lathe apparatus in accordance with claim 1 which is also provided with a spur knife means for cutting the sides of the veneer and a knife groove sleeve means is provided on the end of the nose bar roll for receipt of said spur knife means in a groove on the surface of said sleeve means.

10. Lathe apparatus in accordance with claim 1 in which said support means includes a plurality of separate bearing sleeves spaced along the length of the nose bar roll, said bearing sleeves being open on one side to enable the nose bar roll to engage the log.

11. Lathe apparatus in accordance with claim 10 which also includes lubrication means for said bearing sleeves comprising oil passage means for transmitting oil through the bearing sleeves to the surface of said nose bar roll and air supply means connected to said oil passage means for blowing oil out of said oil passage means into said nose bar roll.

12. Veneer lathe apparatus, comprising:
    rotatable support means for supporting a log for rotation about an axis of rotation;
    cutter means for peeling wood veneer form said log and including a knife blade supported for engaging the side of the log and extending substantially the entire length of said log;
    drive means for engaging said log to cause said log to rotate about said axis of rotation;
    carriage means for moving said cutter means toward said log during said peeling to maintain said knife blade in engagement with said log; and
    a nose bar roll engaging the side of said log on at least the major portion of the length of the log, and extending along but ahead of said knife blade to compress the surface of said log before it is cut by said knife blade to form a sheet of veneer, said nose bar roll being part of said drive means for the log, having a diameter of at least 1.5 inches, and providing the primary means for compression of the log during peeling.

13. Lathe apparatus in accordance with claim 12 in which the nose bar roll is provided with a longitudinally grooved surface for engagement with the log.

14. Lathe apparatus in accordance with claim 13 in which the nose bar roll is connected by a flexible coupling means to drive shaft means for rotating said nose bar roll in response to rotation of said drive shaft means by a motor means.

15. Lathe apparatus in accordance with claim 14 in which both ends of the nose bar roll are driven by separate drive shaft means and separate motor means.

16. Lathe apparatus in accordance with claim 14 in which the flexible coupling means includes a flexible coupling member of synthetic plastic material connecting one end of the nose bar roll to an output drive shaft of the drive shaft means, said coupling member having projections which engages notches in the ends of said nose bar roll and said output drive shaft for coupling the nose bar roll to said drive shaft means.

17. Veneer lathe apparatus, comprising:
rotatable support means for supporting a log for rotation about an axis of rotation;
cutter means for peeling wood veneer from said log and including a knife blade supported for engaging the side of the log and extending substantially the entire length of said log;
drive means for engaging said log to cause said log to rotate about said axis of rotation;
carriage means for moving said cutter means toward said log during said peeling to maintain said knife blade in engagement with said log;
a nose bar roll engaging the side of said log on at least a major portion of the length of said log and extending along but ahead of said knife blade to compress the surface of said log before it is cut by knife blade to form a sheet of veneer, said nose bar roll having a diameter of at least 1.5 inches and greater than the minimum log core diameter to which said log can be peeled by said apparatus and providing the primary means for compression of the log during peeling; and
bearing means extending along the length of the nose bar roll for rotatably supporting said nose bar roll, said bearing means having lubrication means including oil passage means for transmitting oil to the bearing surface and air supply means connected to said oil passage means for blowing oil out of said oil passage means onto said bearing surface.

18. Lathe apparatus in accordance with claim 17 which also includes spur knife means for cutting the sides of the veneer including a knife groove sleeve means on each end of the nose bar roll having knife grooves provided on the surface of said sleeve means for receipt of spur knife blades in said grooves.

19. Lathe apparatus in accordance with claim 17 in which said bearing means includes a plurality of separate bearing sleeves spaced along the length of the nose bar roll, said bearing sleeves being open on one side to enable the nose bar roll to engage the log and said oil passages extending through each bearing sleeve and through a support block supporting said bearing sleeve, said support block having water cooling means therein coupled to the bearing sleeve for cooling said bearing sleeve.

20. Lathe apparatus in accordance with claim 19 in which the bearing sleeves extend in contact with said nose bar roll less than 180 degrees about the nose bar roll, and flexible coupling means are connected between the ends of the nose bar roll and the ends of drive shaft means for powered drive of said nose bar roll and for support of the nose bar roll in the bearing sleeves.

21. Lathe apparatus in accordance with claim 17 in which the nose bar roll has a grooved outer surface and the air supply means is pulsed to apply a greater air pressure to the oil passages at the end of peeling for cleaning the surface of said roll.

* * * * *

UNITED STATES PATENT AND TRADEMARK OFFICE
CERTIFICATE OF CORRECTION

PATENT NO. : 4,602,663
DATED : July 29, 1986
INVENTOR(S) : ROBERT A. BROWNING, JR., and LEONARD L. HAYES It is certified that error appears in the above-identified patent and that said Letters Patent is hereby corrected as shown below:

Facing page, item [73], "Painseville" should be --Painesville--.

Facing page, References Cited, item [56], the following reference was omitted:

3,581,844  6/1971  Carlton.......184/6.14

Column 5, line 36, "adjustmment" should be --adjustment--

Column 5, line 37 "by by" should be --by--

Column 5, line 49, "disccussed" should be --discussed--

Column 7, line 49, "sleve" should be --sleeve--

Column 9, line 43, "40 perecent" should be --40 percent--

UNITED STATES PATENT AND TRADEMARK OFFICE
CERTIFICATE OF CORRECTION

PATENT NO. : 4,602,663

DATED : July 29, 1986

INVENTOR(S) : ROBERT A. BROWNING, JR., and LEONARD L. HAYES

It is certified that error appears in the above-identified patent and that said Letters Patent is hereby corrected as shown below:

Column 9, line 48, "obvius" should be --obvious--

Column 10, line 54, claim 11, "into" should be --onto--

Column 10, line 58, claim 12, "form" should be --from--

Signed and Sealed this

Seventeenth Day of March, 1987

*Attest:*

DONALD J. QUIGG

*Attesting Officer*  *Commissioner of Patents and Trademarks*